(12) United States Patent
Hillgaertner

(10) Patent No.: US 7,264,300 B2
(45) Date of Patent: Sep. 4, 2007

(54) FASTENING ELEMENT FOR A SPOILER WING OF A MOTOR VEHICLE

(75) Inventor: Klaus Hillgaertner, Wurmberg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 23 days.

(21) Appl. No.: 11/177,400

(22) Filed: Jul. 11, 2005

(65) Prior Publication Data

US 2006/0006694 A1 Jan. 12, 2006

(30) Foreign Application Priority Data

Jul. 9, 2004 (DE) ...................... 10 2004 033 175

(51) Int. Cl.
*B62D 35/00* (2006.01)

(52) U.S. Cl. .................................. 296/180.5

(58) Field of Classification Search ............. 296/180.5; 411/178, 383
See application file for complete search history.

(56) References Cited

U.S. PATENT DOCUMENTS

| | | | | |
|---|---|---|---|---|
| 2,395,063 | A | * | 2/1946 | Paulus ..................... 411/411 |
| 5,441,132 | A | * | 8/1995 | Pradel et al. ............... 188/315 |
| 6,261,039 | B1 | * | 7/2001 | Reed .......................... 411/178 |
| 6,595,577 | B2 | | 7/2003 | Adams |
| 2002/0043768 | A1 | * | 4/2002 | Fenn et al. ................. 277/434 |
| 2003/0090126 | A1 | | 5/2003 | Adams |

FOREIGN PATENT DOCUMENTS

| | | |
|---|---|---|
| DE | 2649953 | 5/1978 |
| DE | 101 55 376 A1 | 5/2003 |
| EP | 0882642 | 12/1998 |
| WO | WO97/32770 | 9/1997 |

OTHER PUBLICATIONS

European Search Report dated Jan. 12, 2006.

* cited by examiner

*Primary Examiner*—Dennis H. Pedder
(74) *Attorney, Agent, or Firm*—Crowell & Moring LLP

(57) ABSTRACT

For the fastening of an adjustable spoiler wing of a motor vehicle, a fastening element is provided which is fastened to the outer tube of an adjusting cylinder and consists of a receiving element with a fit-on sleeve fastened thereto, the fit-on sleeve having a sleeve part with an external thread which can be screwed into a fastening nut inside the spoiler. After the fit-on sleeve has been screwed into the fastening nut by way of a tool engaging in a hexagon socket, the adjusting cylinder is screwed by means of a threaded pin on the receiving element into the fit-on sleeve.

17 Claims, 2 Drawing Sheets

FASTENING ELEMENT FOR A SPOILER WING OF A MOTOR VEHICLE

BACKGROUND AND SUMMARY OF THE INVENTION

This application claims the priority of German Application No.: DE 102004033175.8 filed on Jul. 9, 2004, the disclosure of which is expressly incorporated by reference herein.

The invention relates to a fastening element for a spoiler wing of a motor vehicle on an adjusting cylinder which adjusts the spoiler wing to lifted and lowered positions.

The connection of a rear spoiler or of a spoiler wing of a motor vehicle with an adjusting cylinder takes place by means of at least one fastening element which, on one side, is held on the adjusting cylinder and, on the other side, is fastened to the spoiler wing. The fastening can take place by way of screwing devices or bayonet-catch-type connecting elements.

It is an object of the invention to create an improved fastening element by means of which the adjustable spoiler wing can be connected with an adjusting cylinder by a simple mounting.

According to the invention, this object is achieved by providing passenger cell for a passenger vehicle having a B-pillar on each side of the vehicle body, a device being provided to increase the transverse rigidity of the passenger cell in side impact loads behind the front seats, said device comprising a closed hollow beam running approximately horizontally across the longitudinal direction of the vehicle, lateral ends of the device being connected to the adjacent B-pillars, wherein the device is situated approximately at a shoulder height of a vehicle occupant and comprises a central hollow beam offset to the rear in relation to the B-pillars and connected in a force-transmitting manner at its two laterally exterior ends to the B-pillars which are in front as seen in the longitudinal direction of the vehicle via curved side parts as seen from above.

Additional advantageous characteristics of preferred embodiments of the invention are described herein and in the claims.

Important advantages achieved by means of the invention are that the component parts of the fastening element consist of easily producible rotating parts which, for a mounting for the purpose of holding the spoiler wing, only have to be connected with one another by a mutual screwing-together.

Thus, according to the invention, the fastening element comprises a receiving element which is connected with an outer tube of the adjusting cylinder and has a molded-on centric threaded pin. This threaded pin is connected with a fit-on sleeve which directly carries a spoiler wing, and the spoiler wing is held between this fit-on sleeve and a fastening nut. As a result, it is advantageously achieved according to the invention that the adjustable spoiler wing can be fitted onto the adjusting cylinder stationarily held in the vehicle body and can be fastened by means of the fastening nut. The simple mounting method is such that the adjusting cylinder with the receiving element is rotated into the fit-on sleeve which is, in turn, held in the fastening nut.

According to certain preferred embodiments of the invention, so that a firm fit of the spoiler wing is ensured, the receiving element has a centric elevation on its contact surface, which elevation receives cup springs in a centering manner and is supportingly situated opposite a plate of the fit-in sleeve. As a result, a firm fit with a compensation of tolerances is ensured between the receiving element and the fit-on sleeve.

According to certain preferred embodiments of the invention, for the centered arrangement of the fit-on sleeve and thus also of the additional parts of the fastening element as well as for the sealing shutting-off of the outer tube of the adjusting cylinder, the plate of the fit-on sleeve has a stepped edge area which is placed in a fitting manner onto a face of the outer tube. In particular, the plate of the fit-on sleeve has a collar-shaped recess provided on the outer edge, which recess is supported on the face of the outer tube of the adjusting cylinder.

According to certain preferred embodiments of the invention, the fit-on sleeve has a centric sleeve part molded on to the plate, which sleeve part has an internal and external thread and a hexagon socket and is constructed for the connection with the fastening nut by way of the external thread. By means of the hexagon socket in the sleeve part, the fit-on sleeve can be screwed into the spoiler wing. By way of a bore in the outer tube, the receiving element is screwed into the fit-on sleeve by means of a tool, the plate being supported on the elevation of the receiving element as well as on the face of the outer tube.

In the following, the invention will be explained in detail by means of an embodiment illustrated in the drawing. The drawing, the description and the claims contain numerous combined characteristics which the person skilled in the art will expediently also consider individually and combine to appropriate additional combinations.

Other objects, advantages and novel features of the present invention will become apparent from the following detailed description of the invention when considered in conjunction with the accompanying drawings.

DETAILED DESCRIPTION OF THE DRAWINGS

Figure 1:
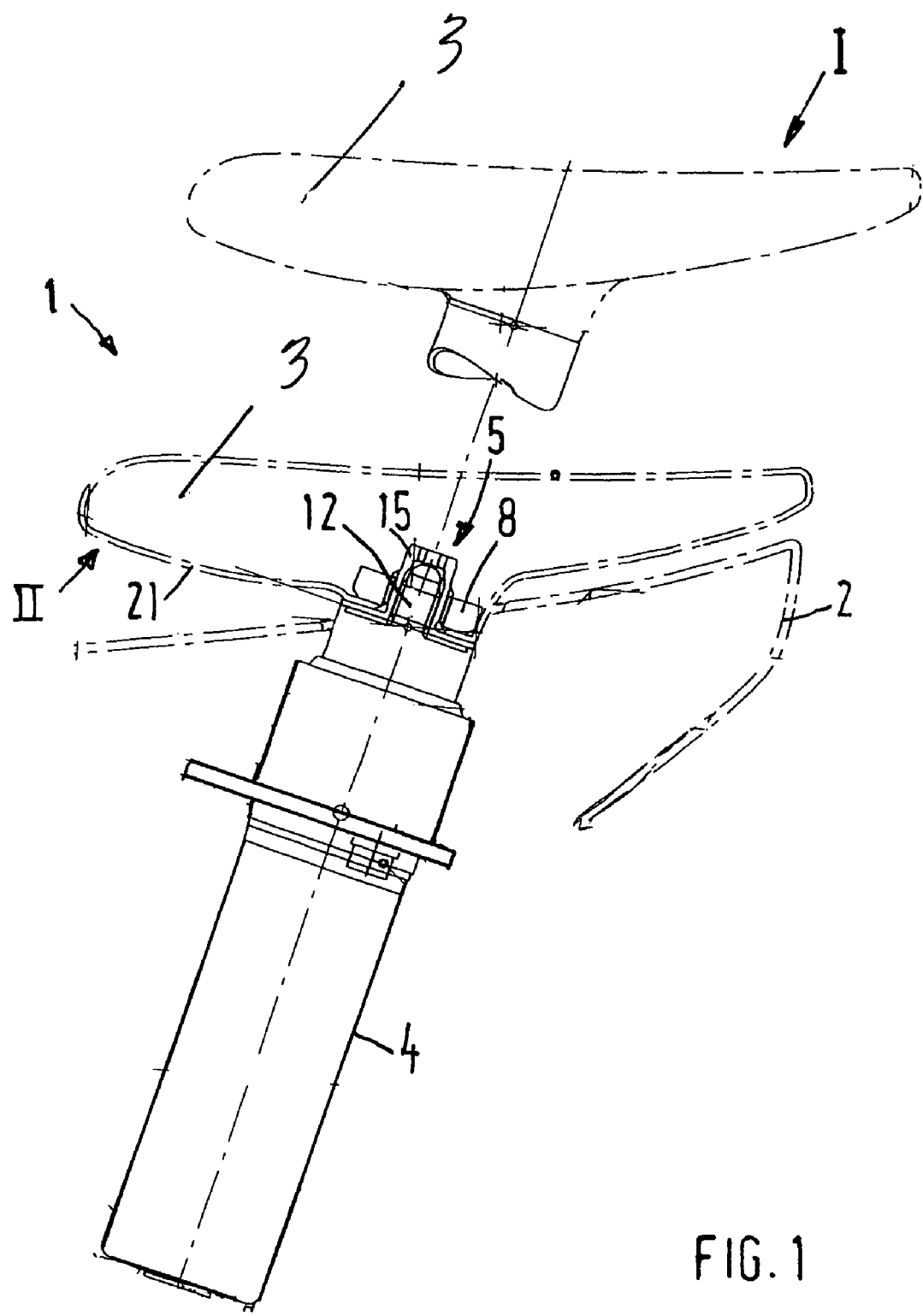
FIG. 1 is a representation of a spoiler a motor vehicle having a spoiler wing which can be lifted and lowered by way of an adjusting cylinder as well as a fastening element arranged between the spoiler wing and the adjusting cylinder.
Figure 2:
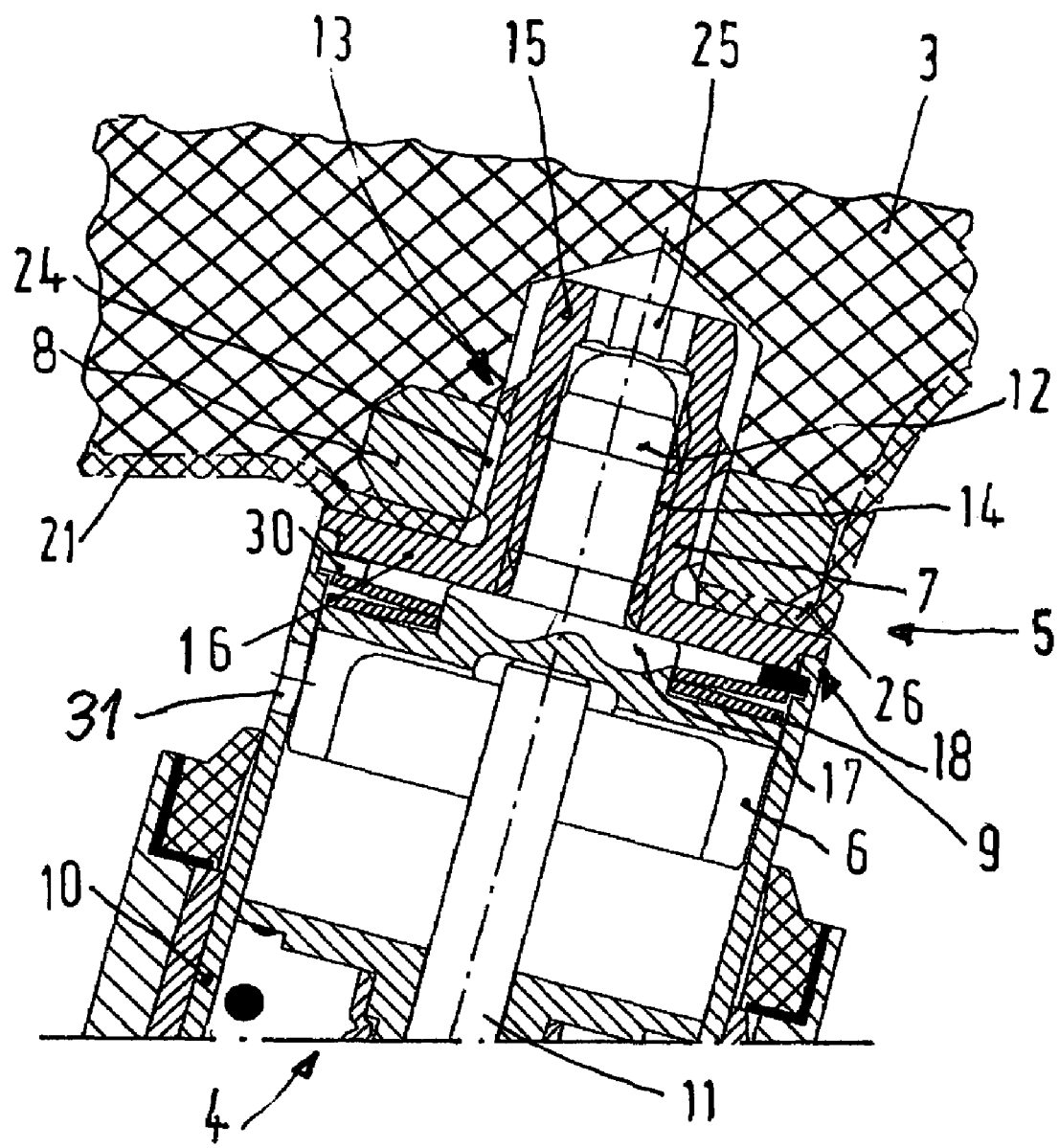
FIG. 2 is an enlarged sectional representation of the fastening element.

A rear spoiler 1 of a motor vehicle comprising of a stationary spoiler element 2 as well as of a liftable and lowerable spoiler wing 3 is adjusted by way of at least one adjusting cylinder 4 into a lifted position I as well as into a lowered position II. A fastening element 5 is used for the firm connection of the spoiler wing 3 with the adjusting cylinder 4. This fastening element 5 comprises a receiving element 6 connected with the adjusting cylinder, a fit-on sleeve 13 as well as a fastening nut 8 and cup springs 9.

The receiving element 6 is inserted in a held manner in an outer tube 10 or in a plunger-type tube of the adjusting cylinder 4 and, on the interior side, has a connection by way of a piston rod 11 of the adjusting cylinder 4. Cup springs 9 are arranged between a snap ring 30 and the receiving element 6, which the receiving element 6 resiliently holds in position during operating movements of the piston rod 11.

The receiving element 6 has a centrically shaped threaded pin 12 which is connected with the fit-on sleeve 13 which, for this purpose, has an internal thread 14 in the sleeve part 15, which internal thread 14 corresponds with the threaded pin 12. This fit-on sleeve 13 comprises a plate 16 which carries the molded-on sleeve part 15 and which is supported on the face side on the outer tube 10 as well as on a centric elevation 17 of the receiving element 6.

For the centering support on the face of the outer tube 10, the plate 16 has a collar-shaped recess 18 extending around on the edge side.

For fastening the spoiler wing 3 on the fit-on sleeve 13, a fastening nut 8 is used which is fastened to the spoiler wall 21 and is arranged in an indentation or recess 26. For the mounting, the fit-on sleeve 13 is screwed into the fastening nut 8 by means of the sleeve part 15 equipped with an external thread 24—which fastening nut 8 is fastened to the spoiler wall 21—, so that the spoiler wall 21 comes to be situated in a clamped manner between the fastening nut 8 and the plate 16 of the fit-on element 13. The screwing of the fit-on sleeve 13 into the fastening nut 8 by means of the sleeve part 15 takes place by means of a tool which engages from the inside in the hexagon socket 25, and the fit-on sleeve 13 can thereby be screwed in. Subsequently, the adjusting cylinder 4 is turned by means of a tool, which engages in an opening 31 of the outer tube 10, and is screwed by means of the threaded pin 12 into the sleeve part 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Fastening element for a spoiler wing of a motor vehicle on an adjusting cylinder which adjusts the spoiler wing to a lifted and lowered position, comprising
    a receiving element connected with an outer tube of the adjusting cylinder and having a molded-on centric threaded pin which is connected with a fit-on sleeve that directly carries the spoiler wing, wherein the spoiler wing is firmly held in a clamped-in manner between the fit-on sleeve and a fastening nut, and the receiving element has a centric elevation on its contact surface, which elevation receives cup springs in a centering manner and is supportingly situated opposite a plate of the fit-on sleeve.

2. Fastening element according to claim 1, wherein the plate of the fit-on sleeve has an edge-side collar-shaped recess which is provided on the outer edge and is supported on the face side of the outer tube of the adjusting cylinder.

3. Fastening element according to claim 2, wherein the fit-on sleeve has a centric sleeve part which is molded onto the plate and has an internal and external thread and a tool engagement or a hexagon socket and is constructed for the connection with the fastening nut by way of the external thread.

4. Fastening element according to claim 1, wherein the fastening nut is arranged in an indentation of the spoiler wing, which fastening nut has a flat contact surface with respect to the indentation as well as to the plate of the fit-on sleeve.

5. Fastening element according to claim 4, wherein the fastening nut is constructed to rest firmly against a spoiler wall of the spoiler wing.

6. Fastening element according to claim 1, wherein the cup springs arranged between the plate of the fit-on sleeve and the receiving element are supported on a snap ring so as to be spaced away from the bottom surface of the plate.

7. Fastening element according to claim 2, wherein the fastening nut is arranged in an indentation of the spoiler wing, which fastening nut has a flat contact surface with respect to the indentation as well as to the plate of the fit-on sleeve.

8. Fastening element according to claim 7, wherein the fastening nut is constructed to rest firmly against a spoiler wall of the spoiler wing.

9. Fastening element according to claim 3, wherein the fastening nut is arranged in an indentation of the spoiler wing, which fastening nut has a flat contact surface with respect to the indentation as well as to the plate of the fit-on sleeve.

10. Fastening element according to claim 9, wherein the fastening nut is constructed to rest firmly against a spoiler wall of the spoiler wing.

11. Fastening element according to claim 2, wherein the cup springs arranged between the plate of the fit-on sleeve and the receiving element are supported on a snap ring so as to be spaced away from the bottom surface of the plate.

12. Fastening element according to claim 3, wherein the cup springs arranged between the plate of the fit-on sleeve and the receiving element are supported on a snap ring so as to be spaced away from the bottom surface of the plate.

13. Fastening element according to claim 4, wherein the cup springs arranged between the plate of the fit-on sleeve and the receiving element are supported on a snap ring so as to be spaced away from the bottom surface of the plate.

14. A motor vehicle spoiler assembly comprising:
    a fixed body part,
    a spoiler wing supported on an adjusting cylinder for movement with respect to the fixed body part, and
    a fastening arrangement for fastening the spoiler wing on the adjusting cylinder,
    wherein the fastening element comprises a receiving element which is connected with an outer tube of the adjusting cylinder and has a molded-on centric threaded pin which is connected with a fit-on sleeve which directly carries the spoiler wing, the spoiler wing is held in a firmly clamped-in manner between this fit-on sleeve and a fastening nut, and the receiving element has a centric elevation on its contact surface, which elevation receives cup springs in a centering manner and is supportingly situated opposite a plate of the fit-on sleeve.

15. An assembly according to claim 14, wherein the plate of the fit-on sleeve has an edge-side collar-shaped recess which is provided on the outer edge and is supported on the face side of the outer tube of the adjusting cylinder.

16. An assembly according to claim 15, wherein the fit-on sleeve has a centric sleeve part which is molded onto the plate and has an internal and external thread and a tool engagement or a hexagon socket and is constructed for the connection with the fastening nut by way of the external thread.

17. An assembly according to claim 16, wherein the fastening nut is arranged in an indentation of the spoiler wing, which fastening nut has a flat contact surface with respect to the indentation as well as to the plate of the fit-on sleeve.

* * * * *